May 20, 1969   D. W. ROLLINS   3,444,825
AUDIBLE SIGNAL MEANS FOR TRAILER HITCHES ON RAILWAY CARS
Filed Feb. 13, 1967   Sheet 1 of 5

INVENTOR.
DALLAS W. ROLLINS
BY
*Samuel J. Snyder*
ATTORNEY

May 20, 1969   D. W. ROLLINS   3,444,825
AUDIBLE SIGNAL MEANS FOR TRAILER HITCHES ON RAILWAY CARS
Filed Feb. 13, 1967

United States Patent Office 3,444,825
Patented May 20, 1969

3,444,825
AUDIBLE SIGNAL MEANS FOR TRAILER HITCHES ON RAILWAY CARS
Dallas W. Rollins, St. Charles, Mo., assignor to ACF Industries, Incorporated, New York, N.Y., a corporation of New Jersey
Filed Feb. 13, 1967, Ser. No. 615,611
Int. Cl. B65j 1/22; B60q 5/00
U.S. Cl. 105—368                                     1 Claim

ABSTRACT OF THE DISCLOSURE

An audible signal device indicates the positive locking of a trailer kingpin on a railway flat car when the kingpin is engaged by the jaws of a trailer hitch mounting plate. The audible signal device is operatively connected to latch means and operable upon movement of the latch means to locked position to emit an audible signal to the tractor operator for indicating a positive locking of the kingpin and a positive securing of a trailer on a railway flat car for transit.

Background of the invention

In the use of tractor operated trailer hitches on railway flat cars, the hitch is erected and collapsed by a tractor. Normally, a separate workman is employed to visually check the hitch when the hitch is erected by the tractor to insure that the trailer kingpin is positively secured for transit of the trailers on the railway car. In the event a separate workman is not employed, the tractor driver-operator must leave the tractor to determine that the trailer kingpin is securely locked in position for transit of the trailer. If the trailer kingpin is not securely locked, then the kingpin may become disengaged during transit with the possibility of the trailer being thrown off or rolling off the railway flat car.

Summary of the invention

The present invention provides an audible signal when the trailer kingpin is securely locked which may be heard by the tractor driver. Thus, a separate workman or the tractor operator does not have to check visually the kingpin locking means to determine if the kingpin is securely locked before the tractor drives away. The invention comprises a fifth wheel mounting plate on the upper end of a vertical leg mounted for movement between a collapsed position and an erect position, the mounting plate having kingpin engaging and retaining means with jaws movable between engaged and disengaged positions relative to the kingpin and actuated into engaged position by impact of the kingpin upon movement of the hitch to erect position, means on said vertical leg adapted to be engaged by lift means on a tractor for raising the leg from a collapsed position to erect position, the kingpin engaging and retaining means including latch means movable into locked position relative to said kingpin engaging jaws upon movement of the jaws to engaged position, and audible signal means operatively connected to said latch means and operable upon movement of the latch means to a locked position to emit an audible signal to a tractor operator or the like for indicating locking of the kingpin.

The invention is illustrated herein in a hitch structurally similar to that shown in Patent 3,225,707. The hitch includes not only trailer kingpin latching means, but also means for latching the diagonal leg in the erect position, as do other tractor operated hitches. As in prior hitches, the locked condition of the latching means can be checked visually at all times, but in addition, a positive signal is emitted at the completion of latching to advise the tractor operator that the trailer is safely supported.

Brief description of the drawing

The invention will be fully understood from the following description and the drawing in which.

Description of the preferred embodiment

Figure 1:
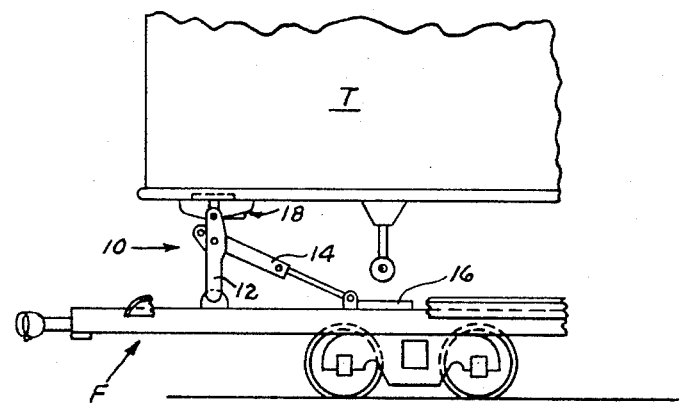
FIG. 1 is a partial elevational view of a highway trailer having its front end supported by a collapsible hitch on a railway flat car.

Referring to the drawing, a flat car F, which is shown only partially, supports a highway trailer T on its deck by means of a trailer hitch 10 engaging the kingpin at the front end of the trailer, as shown more fully in Patent 3,225,707. The hitch includes a vertical leg or support 12 pivotally mounted on the car at its lower end, a diagonal leg or brace 14 pivotally connected at its upper end to leg 12 and pivotally connected at its lower end to the car through a shock absorber 16. A fifth wheel structure 18 is pivotally mounted on the top of vertical leg 12. The leg 14 consists of upper and lower telescoping sections 19 and 20. When diagonal leg 14 is in its erect extended position, sections 19 and 20 are latched together by a latching mechanism 22 comprising pins 23 and 24 pivotally connected to gear racks 25 and 26 movable inwardly and outwardly by the turning of pinion 28. The latter is adapted to be turned by crank 30 connected at its outer end to rod 32, which is urged by spring 34 to the position shown in FIG. 2. This structure is shown and described in detail in Patents 3,225,707 and 3,234,893, and is not the essence of the present invention. As shown and fully explained in said patents, when a bumper block on the rear of a trailer tractor (not shown) impacts pusher bar 36, which is on a lever 37, rod 32 is moved downwardly against spring 34 to turn pinion 28 and retract pins 23, 24 to unlatch diagonal leg 14 and permit it to collapse and to allow the hitch to drop, when at the same time it is also unlatched from the trailer kingpin.

Figure 2:
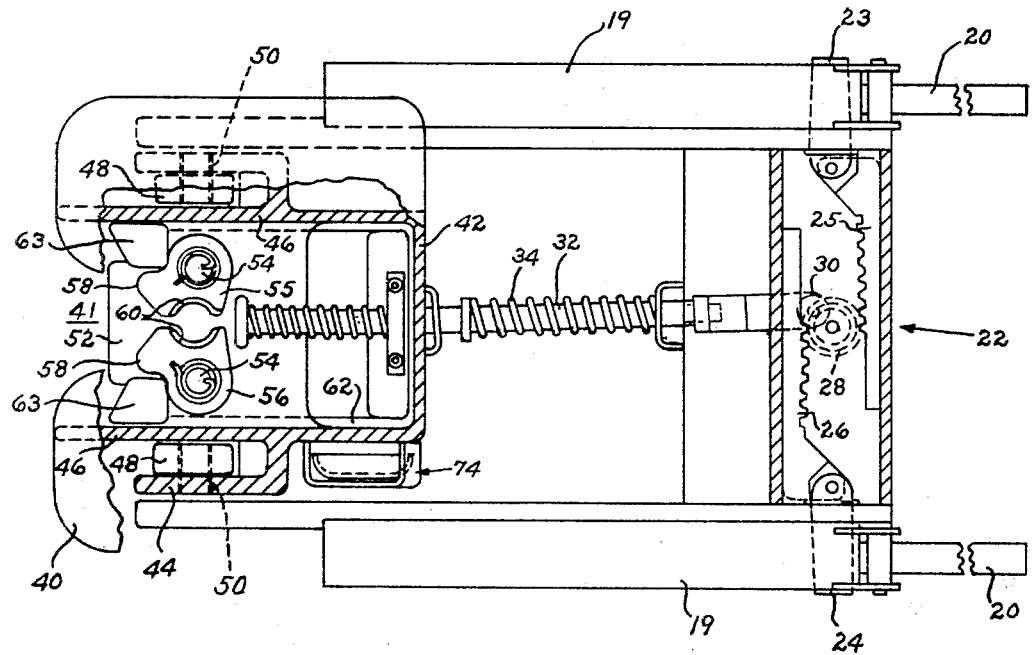
FIG. 2 is a plan view of the fifth wheel structure, with parts broken away, and of the upper portion of the diagonal leg.
Figure 3:
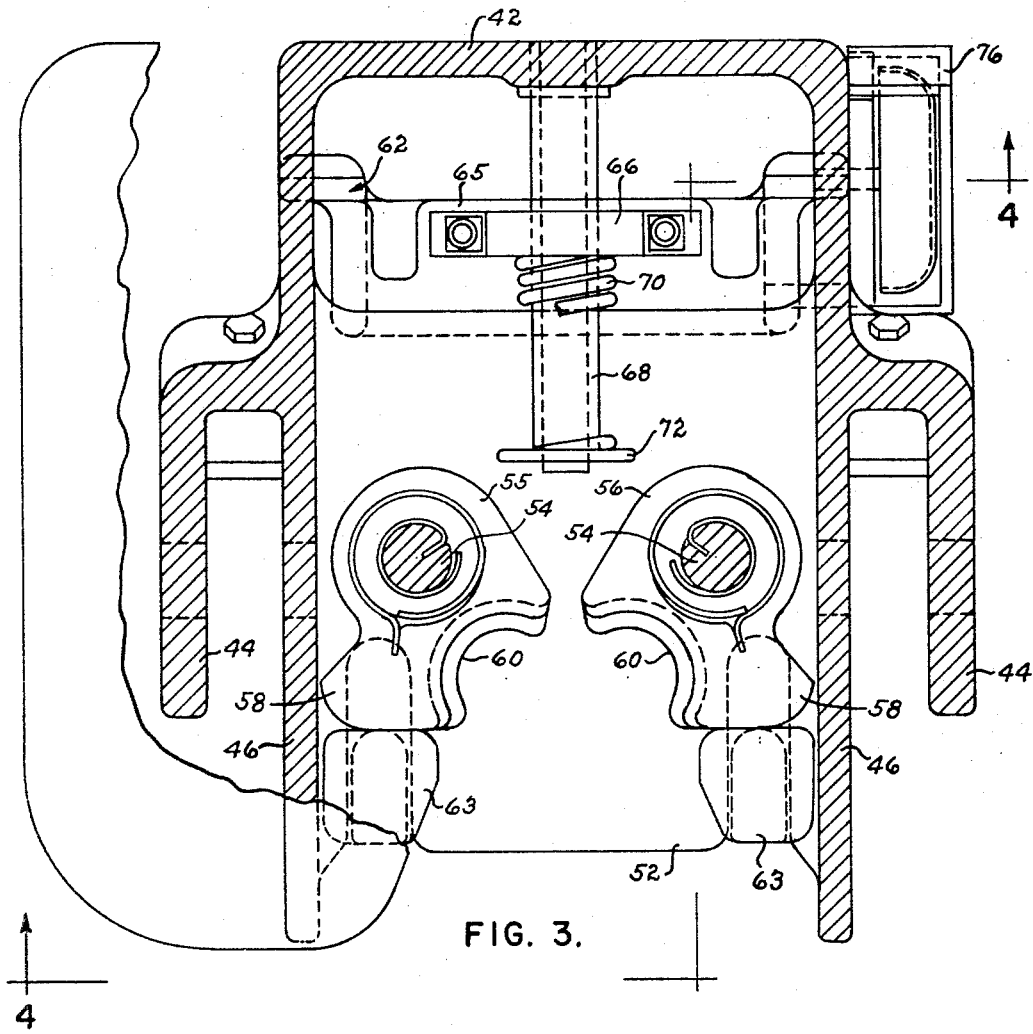
FIG. 3 is an enlarged plan view, partly in section, of the fifth wheel structure with the kingpin locking jaws in open position.
Figure 4:
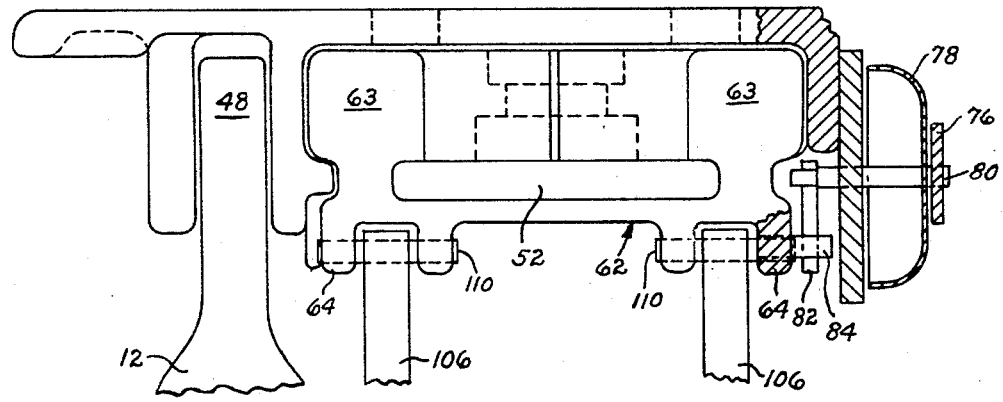
FIG. 4 is a view taken along line 4—4 of FIG. 3.
Figure 5:
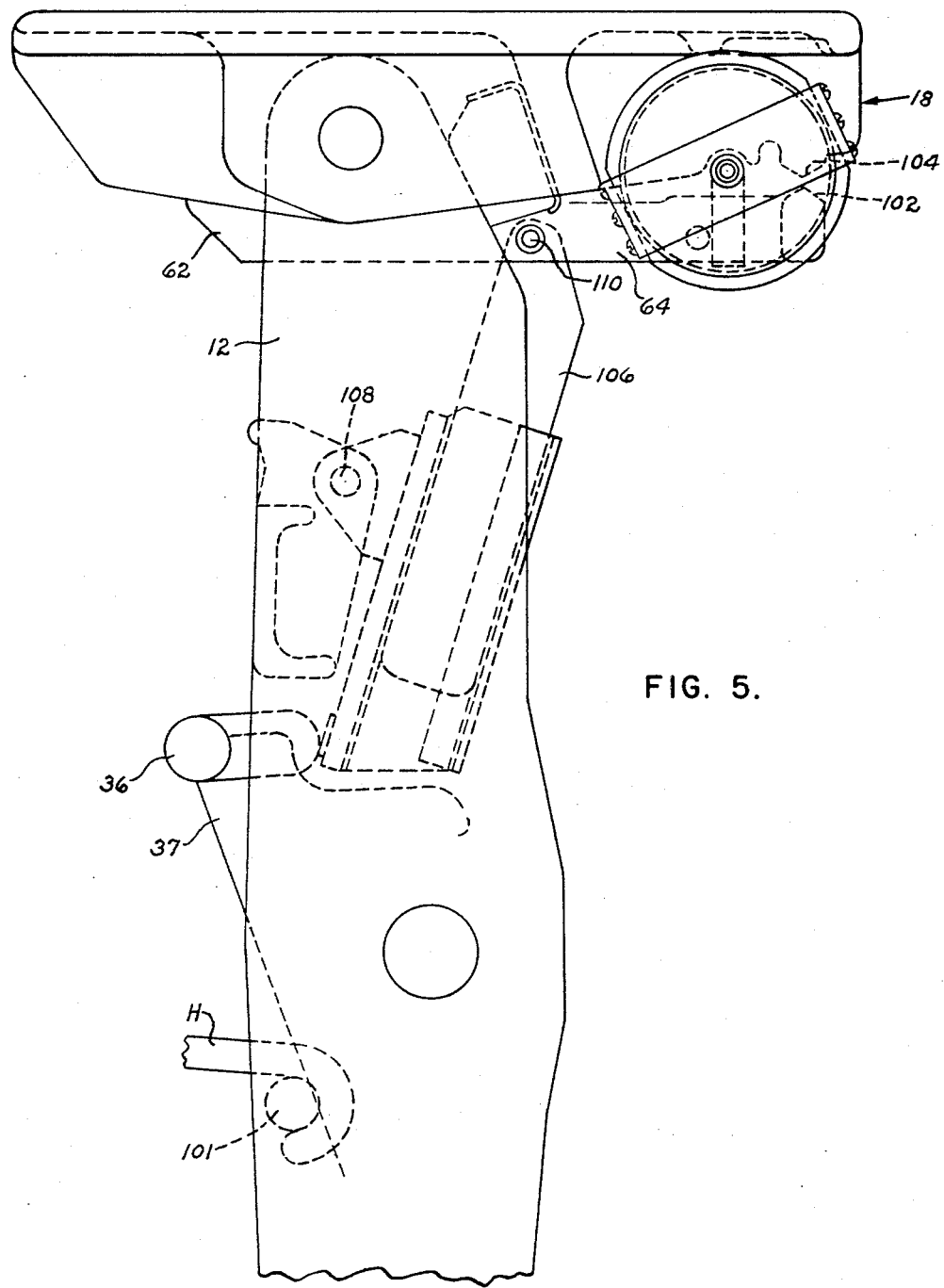
FIG. 5 is a side elevational view of the upper portion of the vertical leg and the fifth wheel structure of the hitch.
Figure 7:
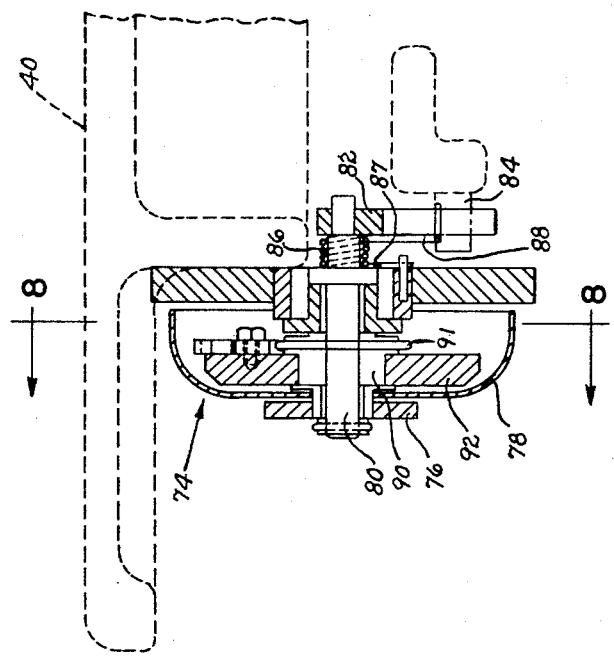
FIG. 7 is a sectional view taken along line 7—7 of FIG. 6.
Figure 6:
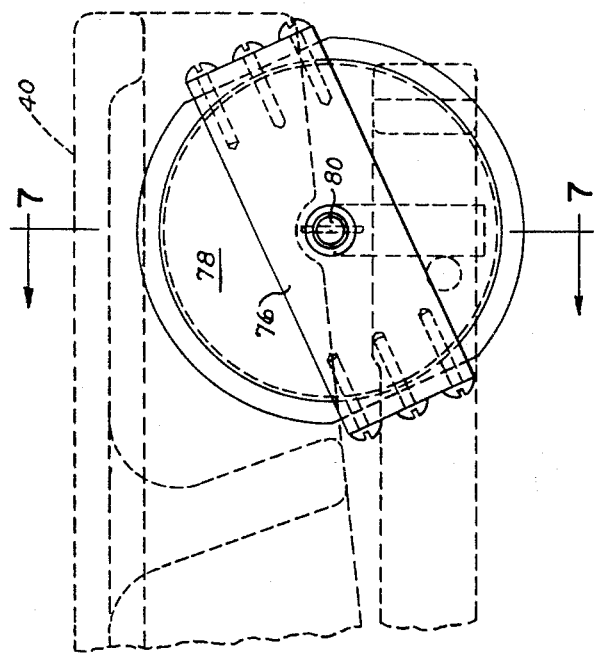
FIG. 6 is an enlarged side view showing the signaling device.

Fifth wheel structure or plate 18 is generally similar to that shown in the above mentioned patents. It includes an upper trailer supporting plate 40 having a forwardly directed opening 41. Plate 40 is preferably a casting having depending ribs 42, 44 and 46. The upper ends 48 of vertical leg 12 extend between ribs 44 and 46 and are held by pins 50. A lower plate 52 is integral with ribs 46. A pair of pins 54 extend vertically between upper and lower plates 40 and 52. Complementary facing locking jaws 55 and 56, rotatable on pins 54, are adapted to engage and hold the kingpin of trailer T. Jaws 55 and 56 have knobs 58 and notches 60 forming a seat for the kingpin. A slidable yoke 62 is provided with blocks 63 at the forward ends of arms 64 of yoke 62 for holding jaws 55, 56 locked, as shown in FIG. 2, or unlocked, as shown in FIG. 3. At the rear of yoke arms 64 is a cross member 65 on which is fastened a loop 66, through which rod 68 slidably extends. Spring 70 is mounted on rod 68 between a fixed stop 72 and loop 66, so that the spring urges yoke 62 rearwardly. When the hitch is pulled into its erect position and the trailer kingpin engages jaws 55 and 56 and closes them, blocks 63 ride off knobs 58 of the jaws and snap into locking position, as shown in FIG. 2.

An audible signal device 74 in the form of a bell is mounted on the side of the fifth wheel plate 18 by a bracket 76. Signal device 74 includes a bell cup 78 and a rotatable shaft 80 extending therethrough. A radial bar 82 is fixed to shaft 80 at its inner end, and bar 82 is held against lug 84 on one arm 64 of the yoke by a tensioned spring 86 having an anchored end 87 and a free end 88 engaging bar 82. A hub 90 having spokes 91 is fixed to shaft 80 and a fly weight or flywheel 92 is rotatably mounted relative to shaft 80. Pawl 94 is pivoted on flywheel 92 at point 96 and the other end of the pawl is connected to one end of spring 98, while its other end 99 is fixed to flywheel 92. Pawl 94 carries a hammer 100 adapted to strike the bell.

Figure 9:
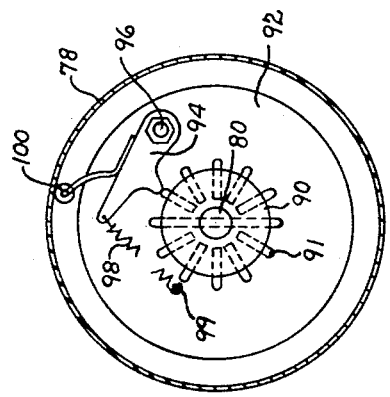
FIG. 9 is a similar view showing the signaling device in another operating position.
Figure 8:
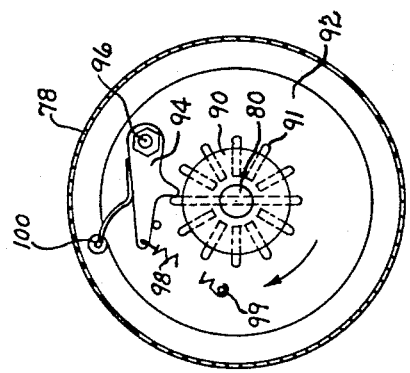
FIG. 8 is a view taken along line 8—8 of FIG. 7.

The operation of signal device 74 is as follows. The tractor (not shown) which moves trailer T onto the car F drops a hook H to engage an element 101 on vertical leg 12, and the tractor thus pulls up the hitch from its collapsed position, as is well known. As the hitch approaches its erect position, the fifth wheel 18 slides under the trailer and the trailer kingpin enters opening 41 of the fifth wheel plate 18 and eventually engages jaws 55, 56, which are open as shown in FIG. 3. The kingpin then turns jaws 55, 56 into closed position. As this occurs, stops 63 of yoke 62, which are held in a forward position by jaws 55, 56 against the compression of spring 70, are suddenly released by jaws 55, 56 and snap into their locking position (FIG. 2). The swift movement of yoke 62 causes lug 84 and arm 82 to turn shaft 80 and hub 90 at a high speed through a given angle. Spokes 91 of hub 90 act on pawl 94 to impart a fast rotation to flywheel 92. Hub 90 has a limited rotation corresponding to the movement of lug 84, but the inertia of flywheel 92 causes it to continue to rotate in a counterclockwise direction, as indicated in FIGS. 8 and 9. As the flywheel rotates relative to hub 90, it carries pawl 94 over spokes 91, as shown in FIG. 9, and the pawl is then pulled inwardly by spring 98 to cause hammer 100 to strike bell 78. The bell may ring several times as pawl 94 rides over several spokes 91, before flywheel 92 stops. The number of rings of the bell is determined by the mass of flywheel 92, spring 70, and other structural elements, and not by operational factors such as the speed of hitch pull-up, so that a distinctive normal ringing is produced. The distinctive ringing of the bell will indicate to the tractor driver that the hitch has been raised and properly locked to the trailer kingpin. Also, the rear ends of yoke arms 64 have pointers 102 which are brought into registry with pointed fixed index members 104 to indicate visually that the kingpin of the trailer is safely locked by jaws 55, 56.

To remove the trailer from the car, pusher bar 36 is impacted by the rear of a tractor. This turns lever 106 about pivot 108 and causes yoke 62 to move forwardly, since lever 106 is pivoted at 110 to the yoke. After yoke 62 is moved forwardly, stops 63 unlock jaws 55, 56, and at the same time pusher rod 36 (by linkage such as disclosed in FIG. 9 of Patent 3,225,707) causes rod 32 to move downwardly to retract pins 23 and 24 and thus unlatch diagonal brace 14 and permit sections 19 and 20 thereof to telescope. As the tractor pushes the hitch, fifth wheel structure 18 moves relative to the kingpin and the latter opens jaws 55, 56, and the hitch pivots backwardly and downwardly into its collapsed position. The elements then assume the position shown in FIGS. 3 and 8.

The foregoing description and the drawing are intended to illustrate and explain an embodiment of my invention, which is not to be construed as limited to that embodiment, except as defined in the claims, since variations within the purview of the invention will be apparent to those skilled in the art. It is apparent, for example, that the invention may be used with other types of hitches, including one having an audible signal device as described in my application "An Audible Signal Device for Trailer Hitches on Railway Cars," Ser. No. 615,415 filed Feb. 13, 1967.

I claim:

1. In a collapsible hitch adapted to be mounted on the deck of a railway car for securing a trailer for transit, a stanchion mounted for movement between a collapsed position adjacent said deck and an erect position, a fifth wheel mounting plate connected to the upper end of said stanchion, said mounting plate having kingpin engaging and retaining jaws movable by the kingpin to engage the kingpin, and latching means adjacent said jaws movable to lock the jaws in their kingpin engaging position, the improvement comprising a bell mounted on said fifth wheel plate, said bell having a hammer, and means connecting said latching means to said hammer for actuating said hammer a plurality of times in response to a movement of said latching means into its jaw locking position, whereby said bell is rung throughout a distinctive protracted period.

References Cited

UNITED STATES PATENTS

| | | | |
|---|---|---|---|
| 2,387,625 | 10/1945 | Walther et al. | 340—52 |
| 3,234,893 | 2/1966 | Sweda | 105—368 |
| 3,347,506 | 10/1967 | Rollins | 248—119 |

DRAYTON E. HOFFMAN, *Primary Examiner.*

U.S. Cl. X.R.

116—60; 248—119